(No Model.)

E. MICHELIN.
WHEEL FOR VELOCIPEDES.

No. 495,982. Patented Apr. 25, 1893.

Witnesses:—
George Barry.
F. Howard Titlar.

Inventor:—
Edouard Michelin
by attorneys
Brown & Seward

THE NORRIS PETERS CO., PHOTO-LITHO., WASHINGTON, D. C.

UNITED STATES PATENT OFFICE.

EDOUARD MICHELIN, OF CLERMONT-FERRAND, FRANCE, ASSIGNOR TO MICHELIN & CO., OF SAME PLACE.

WHEEL FOR VELOCIPEDES.

SPECIFICATION forming part of Letters Patent No. 495,982, dated April 25, 1893.

Application filed December 29, 1892. Serial No. 456,671. (No model.)

*To all whom it may concern:*

Be it known that I, EDOUARD MICHELIN, a citizen of the Republic of France, residing at Clermont-Ferrand, in the said Republic, have invented a new and useful Improvement in Wheels for Velocipedes and other Vehicles, of which the following is a specification.

My invention relates to elastic tires for wheels of velocipedes and other vehicles which are composed of a tight endless tube of india rubber inflated with air surrounding the felly of the wheel and of a protecting band or envelope which covers the said tube and of which two edges are secured to the felly; among tires of this class the improvement especially relates to those in which each of the edges of the protecting band or envelope above mentioned presents a flange and is lodged in a groove or channel formed in the felly, each groove or channel also receiving a small metal band for the purpose of preventing the flange from getting out of the groove or channel.

The improvement consists in the means hereinabove described and claimed of fastening or affixing upon the felly the two ends of the metal band above described and securing them in place.

Figure 1:
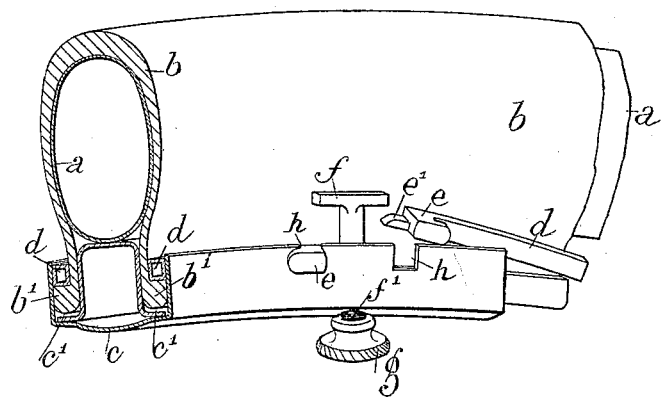
Figure 2:
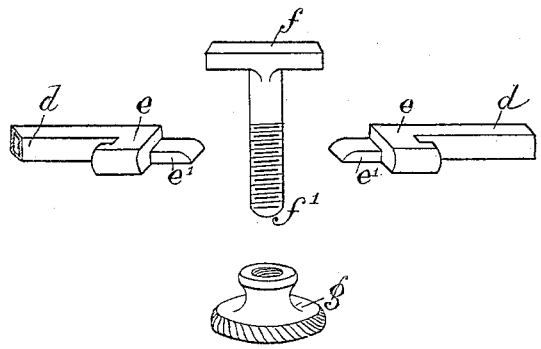

Figure 1 in the accompanying drawings is a perspective view representing a portion of the felly of a velocipede wheel with parts of the air tube and flanged protecting band or envelope, the two ends of one of the metal fastening bands and the fastening bolt for said fastening band showing the locking bolt and one of said ends raised out of their places and the other of said ends in its notch in the felly. Fig. 2 represents separately in perspective the two ends of the fastening band and the T-headed bolt and its nut.

Similar letters of reference designate corresponding parts in all the figures.

$a$ is the endless tube of indiarubber constituting the air chamber of the tire. $b$ is the indiarubber envelope applied outside of the said air chamber for sustaining the pressure and forming the rolling surface, the said envelope being provided with flanges $b'$ $b'$ projecting laterally from its edges and entering the grooves or channels $c'$ $c'$ provided in the hollow felly $c$. $d$ $d$ are the fastening bands of metal represented as hollow and lodged in the grooves or channels $c'$ $c'$ of the felly around the exterior circumference of the flanges $b'$ $b'$. The parts so far described constitute of themselves no part of the present invention but are the subject-matter of my application for United States Letters Patent Serial No. 442,212 filed August 5, 1892.

$e$ $e$ are parts, preferably solid, which form the terminations of each fastening band $d$ and which are made integral with the bands or secured permanently to them; these terminal parts $e$ $e$ have lateral projections to be received each in one of the notches $h$ provided in the exterior wall of each channel of the felly. I prefer to give these projections the form of hooks as is represented in order to make them overlap the exterior of the felly and confine them to the wall of their respective groove or channel. Preferably, also as is shown, the said parts $e$ have a prolongation $e'$ of less depth or thickness than the band.

$f$ is the T-headed bolt. This bolt passes between the ends of the band $d$ and through a hole in the bottom of the channel $c'$ of the felly and its branches are made to overlap the thinned end portions $e'$ of the band and to press down the ends of the band within the channel $c'$ upon the flange $e'$ of the protecting band by means of a nut $g$ screwed upon the screw-threaded portion $f'$ of the stem of the said bolt which protrudes through the bottom of the channel. This bolt holds the lateral projections of the ends of the fastening band $d$ in the notches $h$ of the felly and prevents the said ends from spreading, while the hooked ends of the said projections overlapping the outside of the wall of the felly prevent any lateral displacement of the said ends.

It is obvious that instead of making two notches $h$ in the wall of the channel a single notch may be made wide enough for the reception of the two lateral projections on the ends of the fastening.

The mode of applying the fastening band is as follows: After having introduced into each of the channels of the felly one of the edges of the protecting band and having inserted into the channel outside of each of said flanges one of the fastening bands $d$ and entered the lateral projections *e* into the notch or notches *h*, the T-headed bolt is inserted between the ends of the band and through the hole in the bottom of the channel. The nut *g* is then applied to the screw-threaded portion *f'* of the bolt which projects through the bottom of the channel and on the nut being screwed up the branches of the head of the bolt bring the ends of the fastening band within the channel and upon the flange of the protecting band and the fastening band is thus made to hold the protecting band snugly in place.

The same mode of securing the ends of the fastening band *d* is applicable when the flanges of the protecting band *b* instead of being upon the exterior face of the margin of the said band *b* are upon its interior face and are lodged under a shoulder formed in the interior wall of each channel *c'* in which case the fastening bands are not placed around the flanges but laterally to them between their outer face and the outer wall of each channel of the felly.

What I claim as my invention is—

1. In a wheel tire, the combination of a felly having channels or grooves, a tube constituting an air chamber outside of said felly, a flanged protecting band of flexible material covering said tube and having its flanged edges within the channels or grooves of the felly, and a metal fastening band applied within said channels or grooves outside of the flanges of the said protecting band and provided at each end with a hooked lateral projection engaging in a notch in the felly and overlapping the exterior of the felly, substantially as and for the purpose herein set forth.

2. In a wheel tire, the combination of a felly having channels or grooves, a tube constituting an air chamber outside of said felly, a flanged protecting band of flexible material covering said tube and having its flanged edges within the channels or grooves of the felly, a metal fastening band applied within said channels or grooves outside of the flanges of the said protecting band and provided at each end with a lateral projection engaging in a notch in the felly, and a T-headed screw bolt inserted between the ends of the said fastening band and through the felly and overlapping the said ends, substantially as and for the purpose herein set forth.

In witness whereof I have hereunto set my hand in the presence of two subscribing witnesses.

EDOUARD MICHELIN.

Witnesses:
CHARLES ASSI,
LOUIS GENÉS.